(12) United States Patent
Hall et al.

(10) Patent No.: US 10,810,999 B2
(45) Date of Patent: *Oct. 20, 2020

(54) VOICE-CONTROLLED SECURE REMOTE ACTUATION SYSTEM

(71) Applicant: HALL LABS LLC, Provo, UT (US)

(72) Inventors: David R. Hall, Provo, UT (US); Mark Hall, Springville, UT (US); Craig Boswell, Draper, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/661,361

(22) Filed: Jul. 27, 2017

(65) Prior Publication Data

US 2018/0211651 A1    Jul. 26, 2018

Related U.S. Application Data

(63) Continuation-in-part of application No. 15/457,198, filed on Mar. 13, 2017, now Pat. No. 9,986,065, and
(Continued)

(51) Int. Cl.
| | |
|---|---|
| *G10L 15/08* | (2006.01) |
| *G06F 3/16* | (2006.01) |
| *G10L 15/28* | (2013.01) |
| *G10L 15/02* | (2006.01) |
| *G10L 15/06* | (2013.01) |
| *G10L 15/07* | (2013.01) |
| *H04W 12/00* | (2009.01) |

(52) U.S. Cl.
CPC ............ *G10L 15/083* (2013.01); *G06F 3/167* (2013.01); *G10L 15/28* (2013.01); *G10L 15/063* (2013.01); *G10L 15/07* (2013.01); *G10L 2015/027* (2013.01); *H04W 12/00503* (2019.01)

(58) Field of Classification Search
None
See application file for complete search history.

(56) References Cited

U.S. PATENT DOCUMENTS

| | | | | | |
|---|---|---|---|---|---|
| 4,882,757 | A | * | 11/1989 | Fisher | G10L 15/193 704/253 |
| 8,607,330 | B2 | * | 12/2013 | Childress | G06F 21/31 726/18 |

(Continued)

*Primary Examiner* — Christopher J Fibbi

(57) ABSTRACT

A secure remote actuation system is described herein that operates based on voice commands provided by a user and/or owner of the system. The system may include: a remote input receptor having a user interface for receiving one or more user inputs from a user, the user interface having a voice input processor, and the user inputs including vocalization; and a cloud-based network storing one or acceptable inputs and including a network device for obtaining said one or more user inputs from the remote input receptor. The network device may obtain said one or more user inputs from the remote input receptor while the user is using the user interface. The cloud-based network may compare said one or more user inputs to said one or more acceptable inputs. The voice input processor may include a microphone, a speaker, or both, and may perform various types of voice recognition.

19 Claims, 14 Drawing Sheets

Related U.S. Application Data a continuation-in-part of application No. 15/416,679, filed on Jan. 26, 2017.

(56) References Cited

U.S. PATENT DOCUMENTS

| | | | |
|---|---|---|---|
| 10,231,128 B1* | 3/2019 | Ziraknejad | H04L 9/0825 |
| 2004/0210437 A1* | 10/2004 | Baker | G10L 15/08 |
| | | | 704/251 |
| 2004/0220798 A1* | 11/2004 | Chi | B60R 25/257 |
| | | | 704/201 |
| 2011/0275348 A1* | 11/2011 | Clark | G06F 21/32 |
| | | | 455/411 |
| 2012/0280789 A1 | 11/2012 | Gerhardt | |
| 2013/0195285 A1* | 8/2013 | De La Fuente | G07C 9/00158 |
| | | | 381/92 |
| 2015/0154002 A1* | 6/2015 | Weinstein | G06F 3/167 |
| | | | 715/728 |
| 2015/0261496 A1* | 9/2015 | Faaborg | G06F 3/167 |
| | | | 715/728 |
| 2016/0104486 A1* | 4/2016 | Penilla | H04L 67/12 |
| | | | 704/232 |
| 2016/0260274 A1 | 9/2016 | Kuenzi | |
| 2017/0187697 A1* | 6/2017 | Li | H04L 63/083 |
| 2018/0201226 A1* | 7/2018 | Falkson | B60R 25/257 |
| 2019/0228780 A1* | 7/2019 | Athias | G06F 21/32 |

* cited by examiner

VOICE-CONTROLLED SECURE REMOTE ACTUATION SYSTEM

CROSS REFERENCE TO RELATED APPLICATIONS

This application is a continuation-in-part of U.S. patent application Ser. No. 15/400,313 filed on Jan. 6, 2017, Ser. No. 15/412,745 filed on Jan. 23, 2017, Ser. No. 15/409,908 filed on Jan. 19, 2017, Ser. No. 15/409,934 filed on Jan. 19, 2017, Ser. No. 15/411,345 filed on Jan. 20, 2017, Ser. No. 15/457,198 filed on Mar. 13, 2017, and Ser. No. 15/416,679 filed on Jan. 26, 2017, each of which claim the benefit of U.S. patent application Ser. No. 14/461,166 filed Aug. 15, 2014, which application is now patented as U.S. Pat. No. 9,608,834. This application is also a continuation-in-part of U.S. patent application Ser. No. 14/323,618 filed on Jul. 3, 2014, and Ser. No. 14/461,128 filed on Aug. 15, 2014. Each of the above-referenced applications is incorporated herein by reference in entirety.

BACKGROUND OF THE INVENTION

The present invention relates generally to remote actuation systems comprising devices capable of performing remote operations. Examples of typical remote actuation systems include thermostats, which may control heating and cooling devices from a remote location, and garage door openers, which may provide remote access to secured areas. The remote portions of such devices commonly require a portable power source, such as a battery or photovoltaic cell. It is also typical of such devices to comprise communications means, such as a radio frequency transceiver, to receive and/or relay information.

For example, U.S. Pat. No. 8,331,544 to Kraus et al., which is incorporated herein for all that it discloses, describes a system that remotely operates a door lock. The door lock may be powered by a battery and be configured to send and receive radio frequency signals as part of a mesh network. In such a mesh network, each connected device acts as a communication node that can send and receive packets of information to any other device in the network. The door lock may further comprise a memory module where individual user codes are stored and a logic module to compare user codes to input codes at the door to allow access decisions to be made at the door without transmissions.

Such systems typically require continuing communications over a network that may cause rapid consumption of power. Thus, various attempts have been made to conserve power in 25 such systems. For example, U.S. Pat. No. 4,614,945 to Brunius, et al., which is incorporated herein for all that it discloses, describes communicating information between a plurality of instrument monitoring units to a remotely located data collection unit. The monitoring units are radio frequency transponder circuits that are operatively connected to one or more instruments whose parameters are being monitored. The transponders continuously monitor one or more parameters of the instrument(s) with which they are associated. The transponders collect and accumulate parameter information and/or data from their associated instruments and continually listen for a "wake-up" signal from an interrogate receiver/data collection unit.

Despite these advances in the art, improved means of conserving power in remote actuation systems is desirable.

BRIEF SUMMARY OF THE INVENTION

A secure remote actuation system may comprise a remote input receptor and a network. The remote input receptor may comprise a user interface for receiving user inputs from a user. The network may comprise a combination of computer systems interconnected by telecommunications equipment or cables allowing information to be exchanged. The network may also comprise a network device for obtaining the user inputs from the remote input receptor. One or more acceptable inputs may be stored on the network. In the present invention, the network device obtains the user inputs from the remote input receptor while the user is using the user interface and then the network compares the user inputs to the acceptable inputs.

The remote input receptor may also comprise a communication device, such as a radio frequency transceiver, for sending the user inputs to the network device. The remote input receptor may further comprise a portable power source, such as a battery or solar panel.

The remote input receptor may be capable of executing a low power function after the user inputs are received from the user, wherein power is cut from unneeded subsystems and reduced in others until reactivated. The remote input receptor may exit the low power function when the user begins to use the user interface again.

The remote input receptor may additionally comprise a surveillance device to detect the user, such as a camera, a microphone, a proximity sensor, or a combination thereof. The remote input receptor may then exit the low power function when the surveillance device detects the user.

The user interface may comprise buttons, a visual display, capacitive sensors, a microphone, a vibration recognition module, a proximity sensor, a fingerprint scanner, a retina scanner, a voice recognition module, or a combination thereof as a means for receiving acceptable inputs from a user.

The remote input receptor may comprise data connection ports. Such data connection ports may be disposed in an interior of the remote input receptor.

The network may comprise a software application allowing for an individual to control the acceptable inputs. For example, the software application may allow the individual to edit, add, or delete the acceptable inputs from the network, change parameters, change personal settings, alter system firmware, and/or conduct diagnoses.

The network device may further comprise an internal memory unit for storing the acceptable inputs, the user inputs, a history of user inputs, input parameters, and/or access parameters. Additionally, the network may be operably connected to and capable of controlling various actionable devices, such as a thermostat, a television, an automated window, automated blinds, a ventilation system, a sprinkler system, a lighting element, an indoor positioning system, an access control device, or a combination thereof. The access control device may be an electromechanical locking mechanism or a garage door opener that may secure an enclosed area, room, building, or delivery box.

A secure remote actuation system is also described herein that operates based on voice commands provided by a user and/or owner of the system. The system may include: a remote input receptor having a user interface for receiving one or more user inputs from a user, the user interface having a voice input processor, and the user inputs including vocalization; and a cloud-based network storing one or acceptable inputs and including a network device for obtaining said one or more user inputs from the remote input receptor. The network device may obtain said one or more user inputs from the remote input receptor while the user is using the user interface. The cloud-based network may compare said one or more user inputs to said one or more acceptable inputs.

The voice input processor may include a microphone, a speaker, or both. The one or more acceptable inputs may include a voice profile. The voice profile may be user-dependent or user-independent. The voice profile may be based on a vocal register unique to the user. The voice profile may be based on two or more syllables uttered by an authorized user. The one or more acceptable inputs may include an ordered set of the syllables, may include a set of the syllables that is order-independent, or both. The voice input processor may be multi-lingual.

The voice input processor may perform discrete speech recognition to create a voice profile that the cloud-based network compares to the one or more acceptable inputs. The remote input receptor may provide a failure indication to the user as a pause between vocalizations by the user is less than a minimum required pause ranging from 0.25 s to 1.5 s. The voice input processor may perform continuous speech recognition to create a voice profile that the cloud-based network compares to the one or more acceptable inputs. The remote input receptor may provide a failure indication to the user as a pause between vocalizations by the user is greater than a maximum allowable pause ranging from 0.1 s to 1.0 s. The voice input processor may perform natural language recognition to process commands provided to the remote input receptor by the user. The commands may include updating a voice profile stored on the cloud-based network, adding new acceptable inputs to the cloud-based network, removing one or more of the one or more acceptable inputs from the cloud-based network, changing permissions associated with one or more of the one or more acceptable inputs, changing settings of the remote input receptor, or combinations thereof. The voice input processor may be multi-lingual.

DETAILED DESCRIPTION OF THE INVENTION

Figure 1:
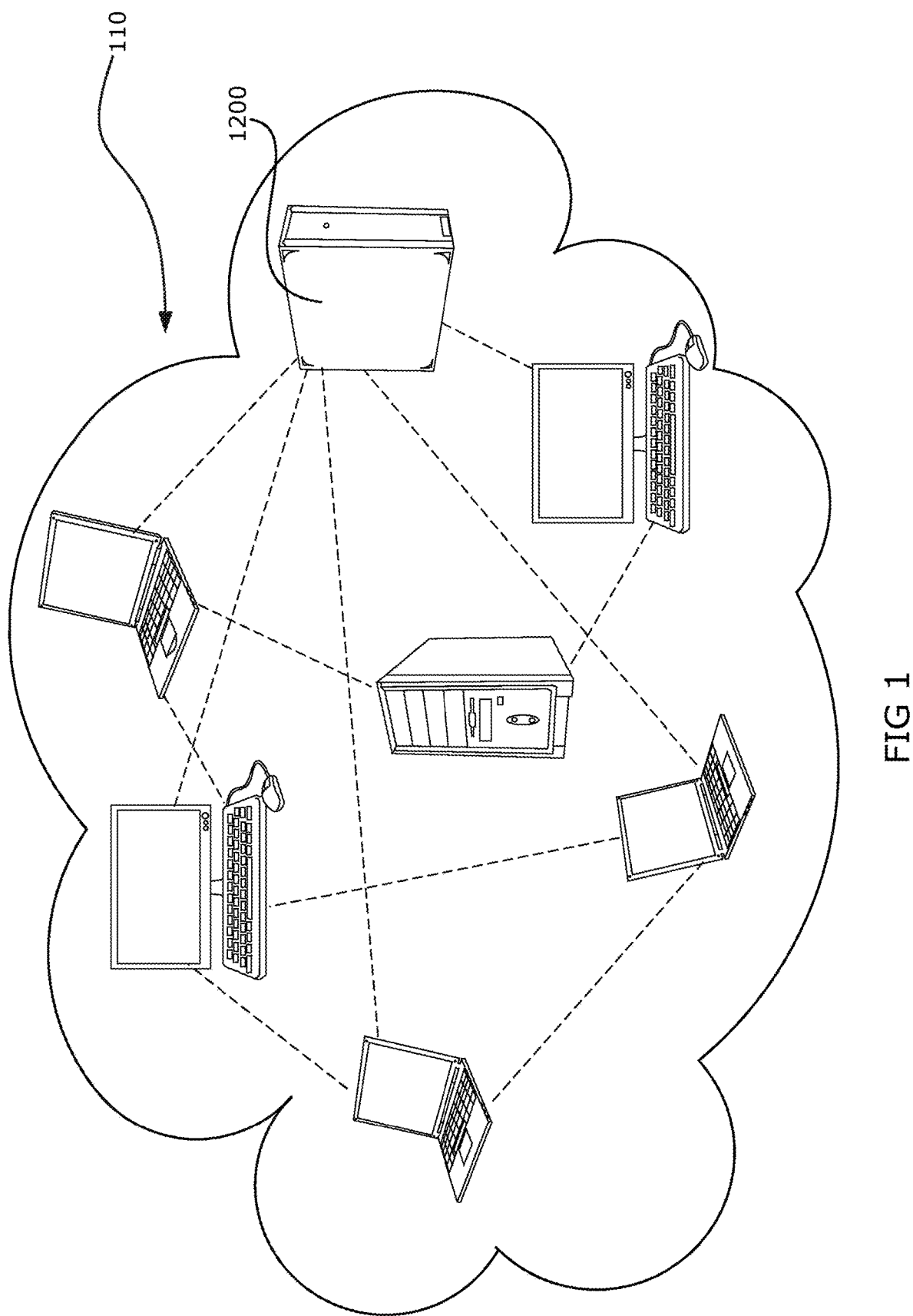
FIG. 1 is a schematic representation of an embodiment of a network device operably 15 connected to a network.

FIG. 1 shows an embodiment of a network device 1200 forming a part of a network 110. The network 110 may comprise a combination of computer systems interconnected by telecommunications equipment or cables allowing information to be exchanged. In various embodiments, network devices may comprise a desktop or laptop computer, a cell phone, a computer server, or other devices capable of communicating on such a network.

Figure 2:
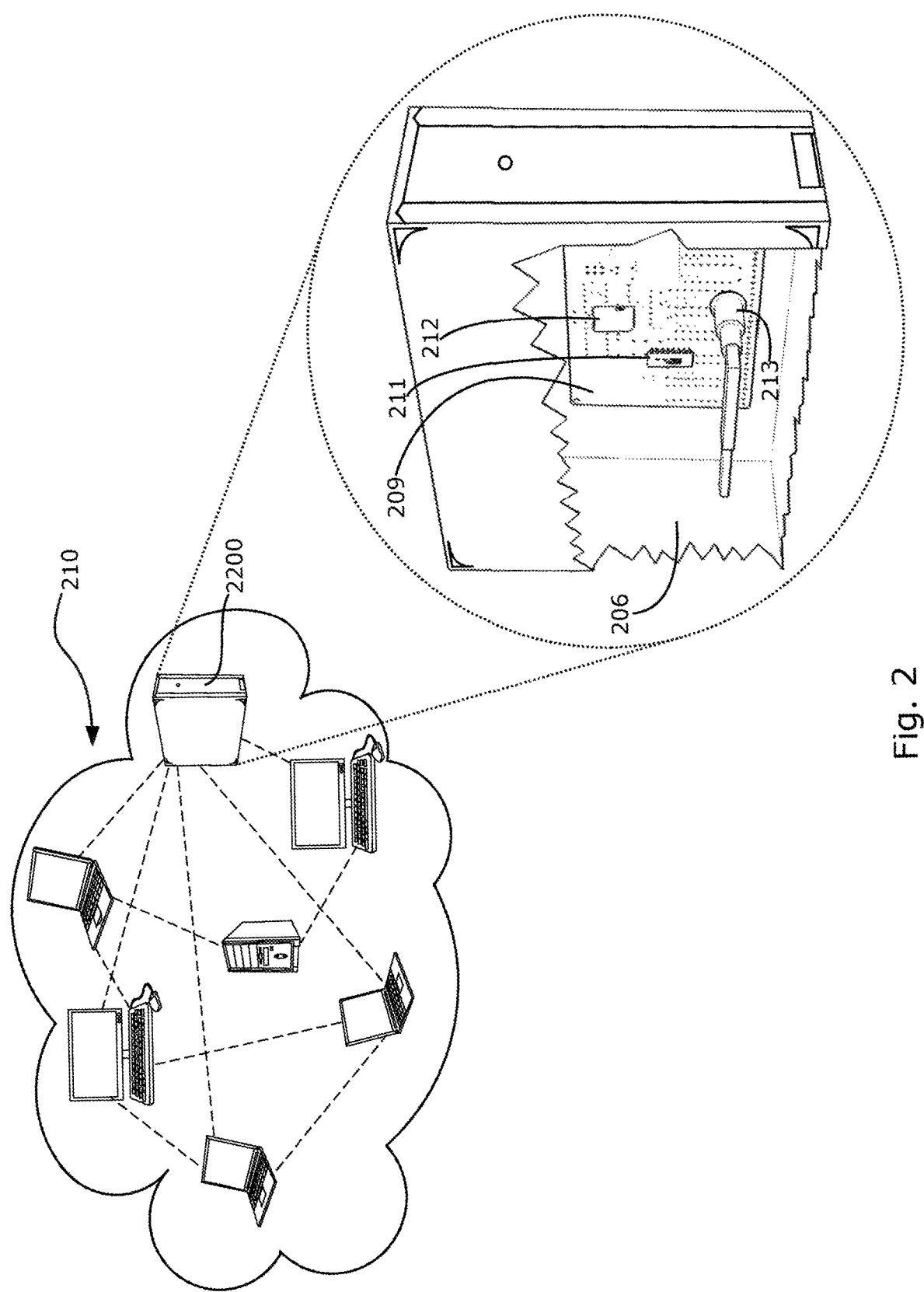
FIG. 2 is a partially cutaway perspective view of an embodiment of a network device forming part of a network, the network device comprising a plurality of components supported by a printed circuit board disposed therein.

FIG. 2 shows an interior 206 of an embodiment of a network device 2200 forming part of a network 210. The network device 2200 may comprise a plurality of components supported by a printed circuit board 209 disposed therein. For instance, the embodiment of the network device 2200 shown comprises a microcontroller 211 and an internal memory unit 212 capable of obtaining and storing one or more user inputs from a remote input receptor (not shown). The network device 2200 may also comprise a communication device 213, such as a radio frequency transceiver, for receiving the one or more user inputs. The radio frequency transceiver may be a universal device capable of communicating with a plurality of other devices by reciprocating various radio frequency transmissions.

Figure 3B:
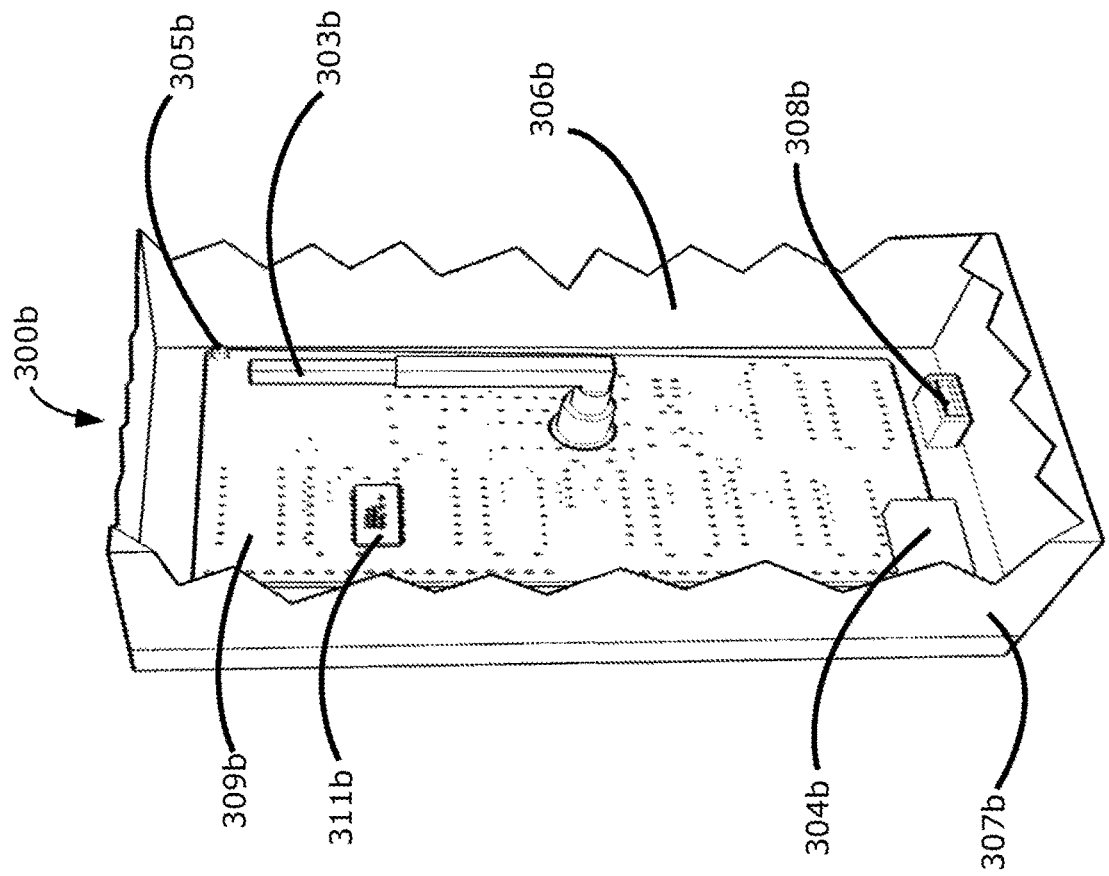
FIG. 3B is a partially cutaway perspective view of an interior of the remote input receptor shown in FIG. 3A comprising a plurality of components supported by a printed circuit board disposed therein.
Figure 3A:
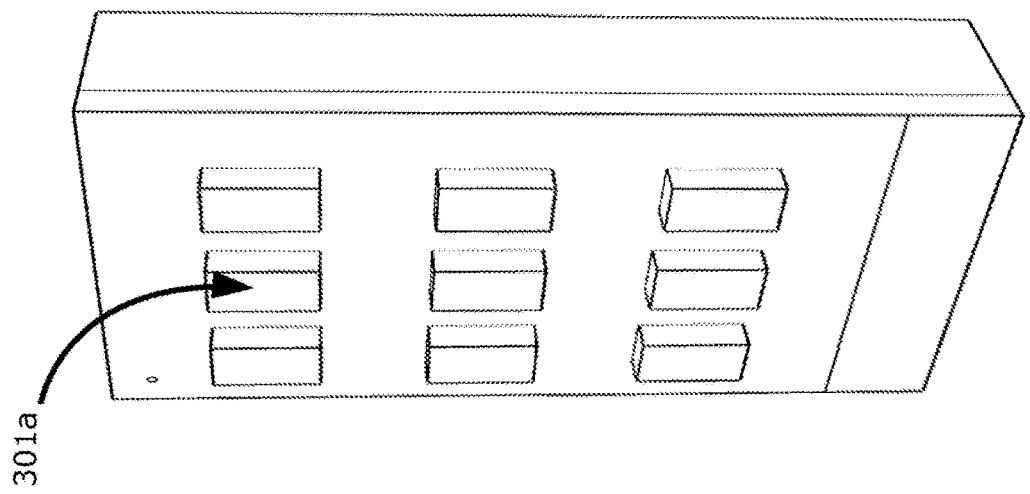
FIG. 3A is a perspective view of an embodiment of a remote input receptor.

FIGS. 3A-B show a perspective view and a partially-cutaway perspective view, respectively, of an embodiment of a remote input receptor 300b comprising an interface 301a and an interior 306b with a plurality of components supported by a printed circuit board 309b disposed therein.

The printed circuit board 309b may support at least a microcontroller 311b and a communication device 303b. After a user supplies one or more user inputs, the remote input receptor 300b may transmit the one or more user inputs to a network (not shown). The network may store and compare one or more acceptable inputs to the one or more user inputs. If the one or more user inputs correspond with the one or more acceptable inputs, the network may perform an operation.

The communication device 303b may comprise a radio frequency transceiver or other known communication apparatus. The communication device 303b may communicate at a sub-1 GHz frequency. It may be appreciated by those of ordinary skill in the art that communications at sub-1 GHz frequencies may be more capable of propagating through environmental obstacles, such as a plurality of walls in a residential home, than communications at frequencies higher than 1 GHz. It may therefore be desirable for said communication device 303b to transmit signals at a sub-I GHz frequency. In some applications, it may be desirable to communicate at a 2.4 GHz or 5.8 GHz frequency to achieve compatibility with other devices, such as those that communicate using ZigBee, Z-Wave, Bluetooth, or Wi-Fi.

The remote input receptor 300b may be powered by a portable power source 304b, such as one or more galvanic or voltaic batteries, one or more solar cells, or other known means of portable power. The remote input receptor 300b may execute a low power function after a user has submitted a user input to the user interface 301a. Such a low power function may be executed for a predetermined amount of time or until a user starts to use the user interface 301 a again. When the low power function is executed, the remote input receptor 300b may cut power from unneeded subsystems and reduce power in others until reactivated. This low power function, combined with not requiring continuous intermittent communication with the network, may enable the portable power source 304b of the remote input receptor 300b to last significantly longer than portable power sources of other known remote actuation systems.

The remote input receptor 300b may further comprise one or more surveillance devices 305b, such as a security camera, a microphone, a proximity sensor, or other known surveillance means. For example, a security camera may be disposed within the interior 306b of the remote input receptor 300b, with a lens of the camera extending through an exterior 307b of the remote input receptor 300b. The one or more security devices 305b may continuously gather and transmit information from an environment to a network (as shown in FIG. 1). Additionally, the one or more surveillance devices 305b may trigger the remote input receptor 300b to exit the low power function when the one or more surveillance devices 305b detect a user.

The remote input receptor 300b may comprise one or more data connection ports 308b for interacting with firmware of the remote input receptor 300b, such as altering or updating the firmware, running system diagnostics, or managing acceptable inputs and/or input parameters. In some embodiments, such firmware functions may also be performed via a network (not shown). The one or more data connection ports 308b may be disposed on the interior 306b of the remote input receptor 300b to aid in preventing undesired access or accumulation of debris from the surrounding environment. The one or more data connection ports 308b may be able to be accessed by detaching a portion of the exterior 307b of the remote input receptor 300b.

Figure 4A:
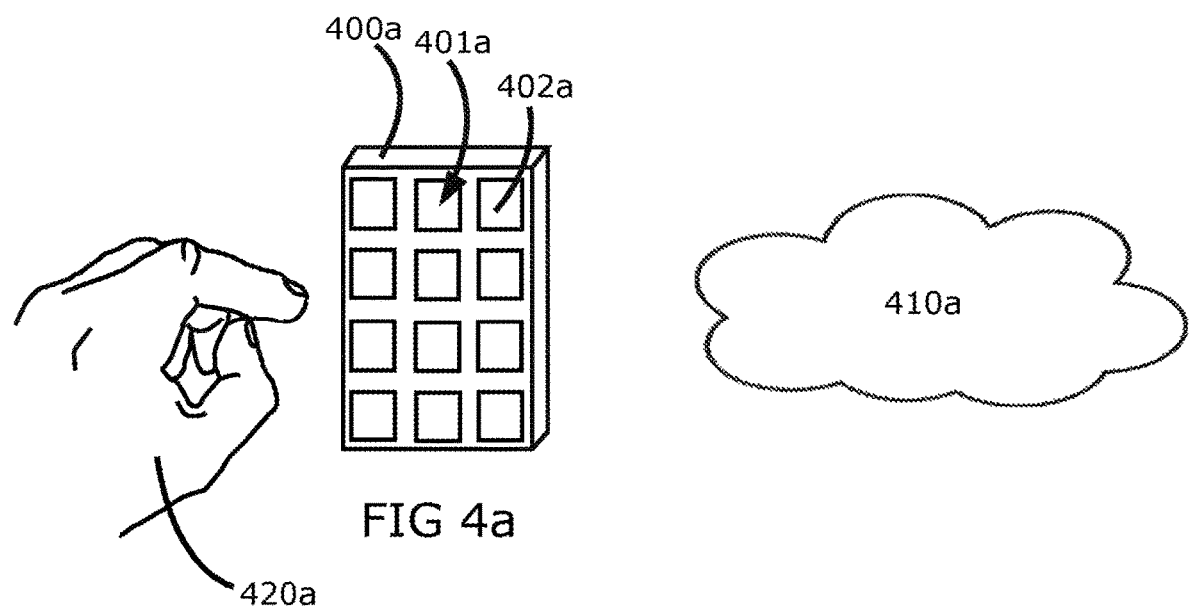
FIGS. 4A-B are perspective views of an embodiment of a portion of a user and a remote input receptor comprising a user interface and operably connected to a network.

FIG. 4A shows an embodiment of a remote input receptor 400a, a network 410a, and a user 420a. The remote input receptor 400a may comprise a user interface 401a for receiving one or more user inputs from the user 420a. The user interface 401a shown comprises one or more buttons 402a. Such user interfaces may also comprise a visual display, one or more capacitive sensors, a microphone, a vibration recognition module, a proximity sensor, a fingerprint scanner, a retina scanner, a voice recognition module, or other known interfacing means. The voice recognition module may be multi-lingual.

Figure 4B:
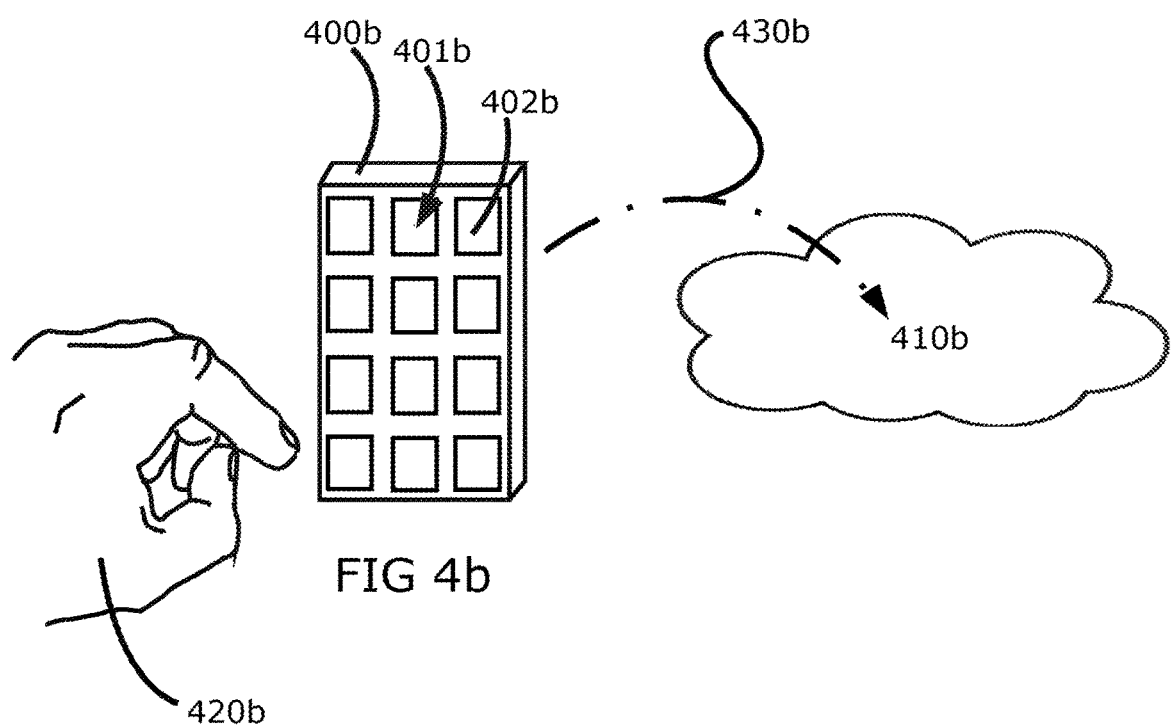

FIG. 4B shows an embodiment of a user 420b supplying one or more user inputs into a remote input receptor 400b by pressing at least one button 402b on a user interface 401b. The one or more user inputs may comprise a keystroke, or any other action receivable by a user interface. As the user 420b supplies each of the one or more user inputs to the user interface 401b, the remote input receptor 400b may send a signal 430b representing each of the user inputs to a network 410b. The network 410b may perform an operation upon receipt of a correct succession of signals or deny an operation upon receipt of an incorrect succession of signals.

Figure 5:
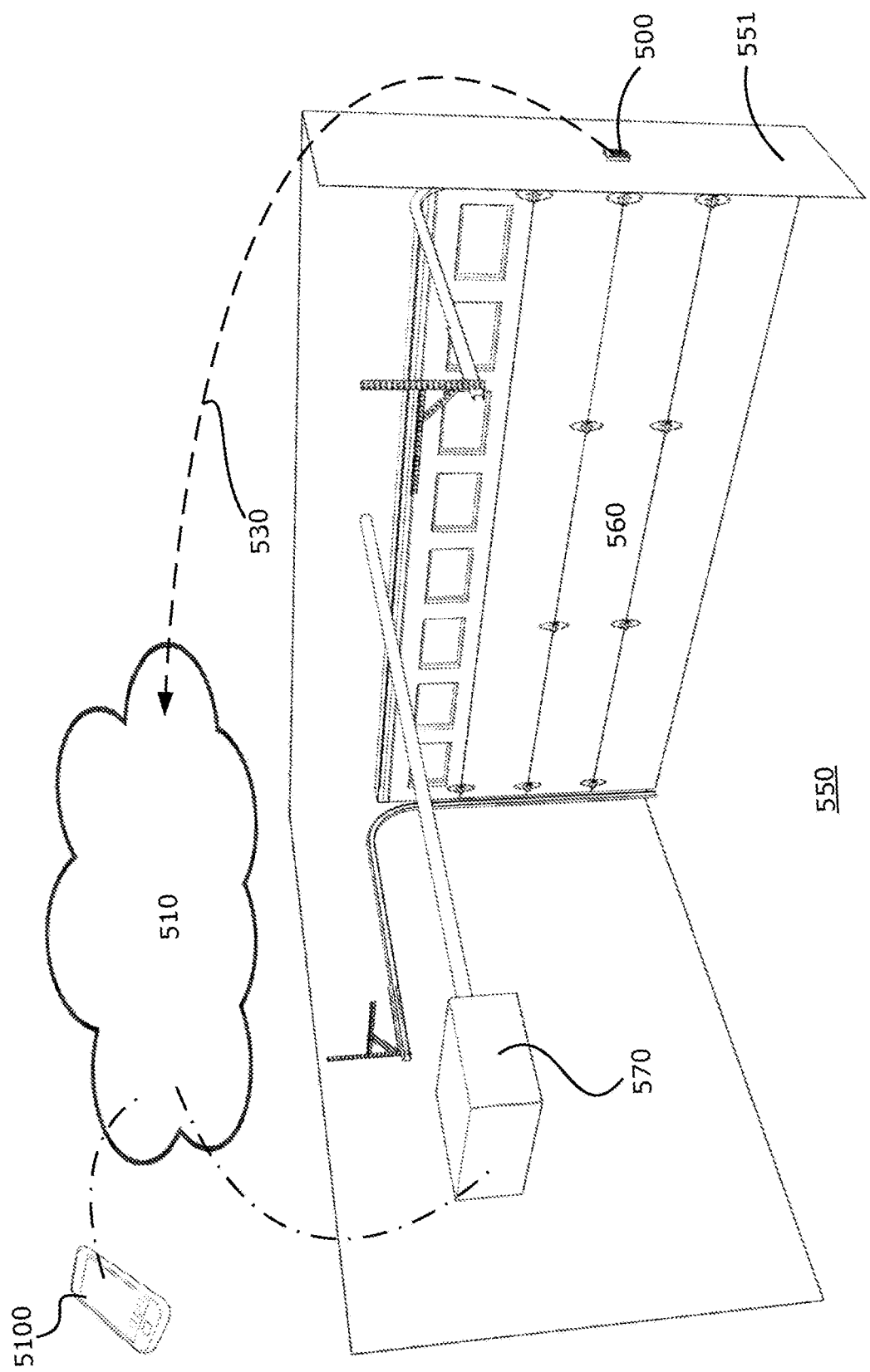
FIG. 5 is a perspective view of elements of an embodiment of a secure remote actuation system associated with an enclosed area.

FIG. 5 shows an embodiment of an enclosed area 550 comprising an access barrier 560, such as a door, for blocking or allowing access to the enclosed area 550. The access barrier 560 may comprise an actionable device 570, such as a garage door motor or a door lock, for permitting or denying access to the enclosed area 550. A network 510 may be operably connected to the actionable device 570, wherein the network 510 is capable of actuating the actionable device 570.

A remote input receptor 500 capable of receiving one or more user inputs may be disposed in, near, or on an exterior 551 of the enclosed area 550. The remote input receptor 500 may be connected to the network 510 via a wireless connection 530. As a user begins supplying a user input to the remote input receptor 500, the network 510 may obtain the user input from the remote input receptor 500. For example, if a user supplies one or more user inputs to the remote input receptor 500, the remote input receptor 500 may send the user inputs to the network 510. If the user inputs are found to be acceptable at the network 510, such as being one of a list of acceptable inputs, the network 510 may perform an operation, such as opening or closing the access barrier 560, or engaging or disengaging a door lock.

In various embodiments, an actionable device may comprise an access control device, such as an electromechanical door lock, a garage door motor, or another access restricting mechanism. Actuation of the access control device may comprise an opening of a door or an engagement or disengagement of a lock. In these embodiments, a user may gain access to a secure area by supplying inputs to a remote input receptor that match one or more acceptable inputs. In other embodiments, an actionable device may comprise a thermostat, a television, an automated window, automated blinds, a ventilation system, a sprinkler system, a lighting element, an indoor positioning system, or other such devices known in the art.

The network 510 may comprise one or more electronic devices 5100. In the embodiment shown, the one or more electronic devices 5100 comprises a smartphone. However, other embodiments of an electronic device may comprise a laptop or desktop computer, a tablet, or other devices capable of communicating over such a network. The electronic device 5100 may comprise a software application for management of the network 510 including creating, deleting, or editing one or more acceptable inputs.

Additionally, the software application may be used to create, delete, or edit one or more input parameters. Such input parameters may be used to determine one or more conditions upon which an actuated system may operate. For example, the one or more input parameters may comprise a predetermined user interface interaction sequence, such as a combination of keystrokes supplied by a user, a combination of user inputs, a predetermined sequence of user inputs, a time window during which the network 510 may receive one or more user inputs, a limitation on which one or more user inputs may be supplied to gain access to the secure area 550, or a limitation on how many times one or more user inputs may be received by the network 510.

Figure 6A:
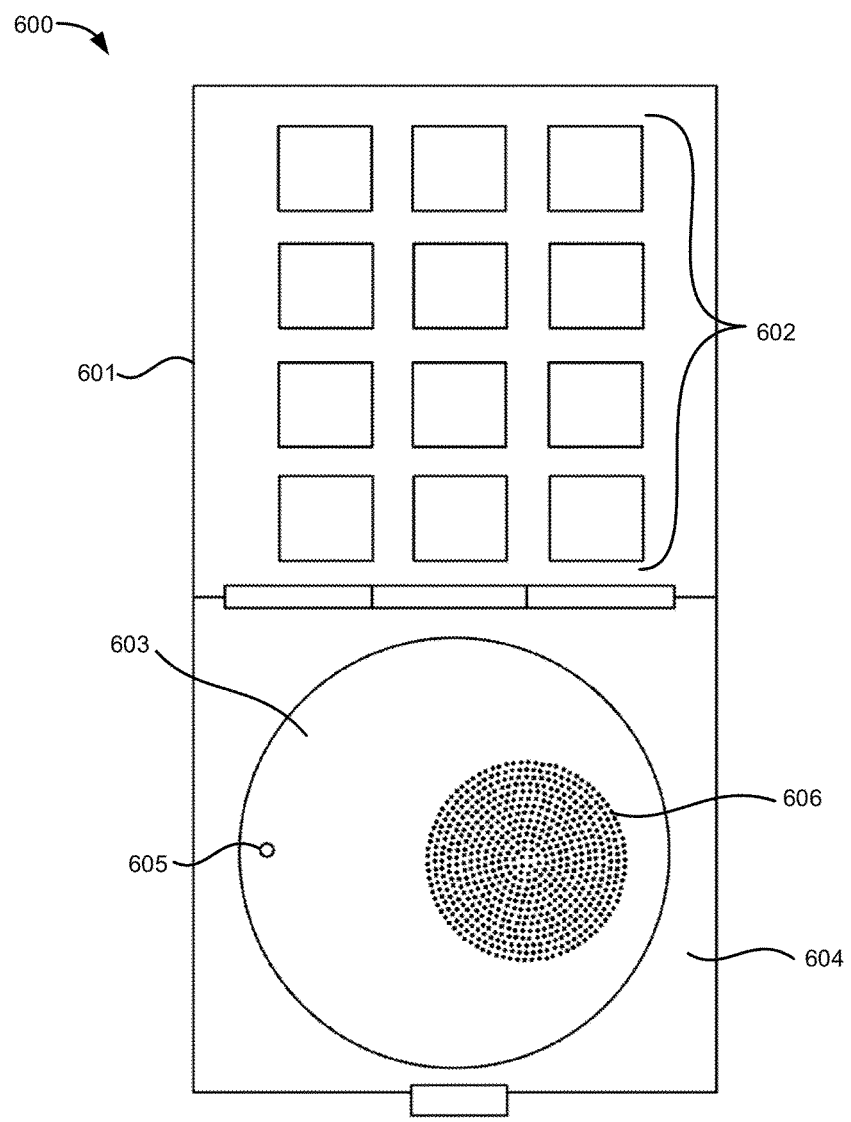
FIGS. 6A-C depict various views of a remote input receptor incorporating a voice input processor.
Figure 6B:
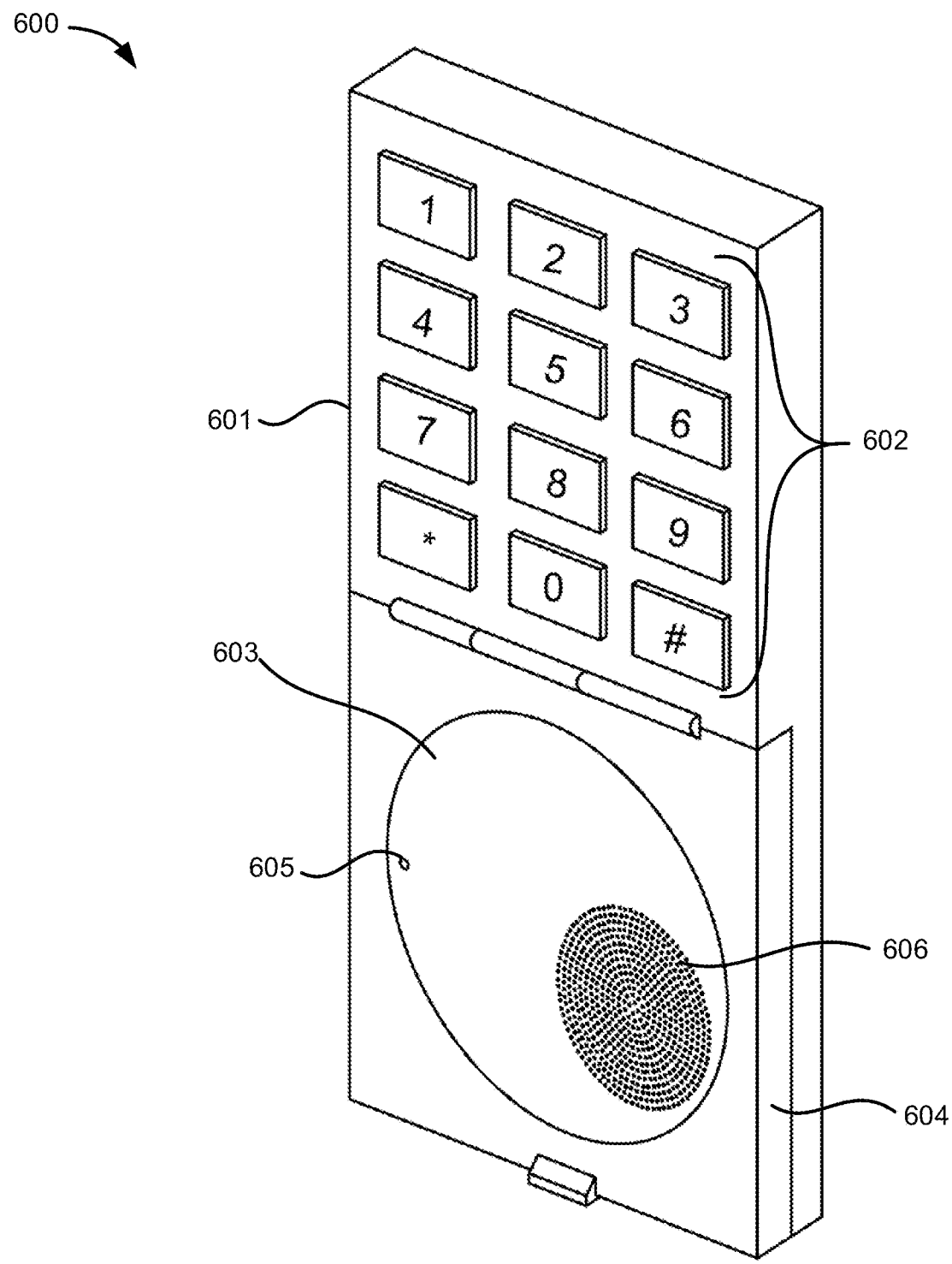
Figure 6C:
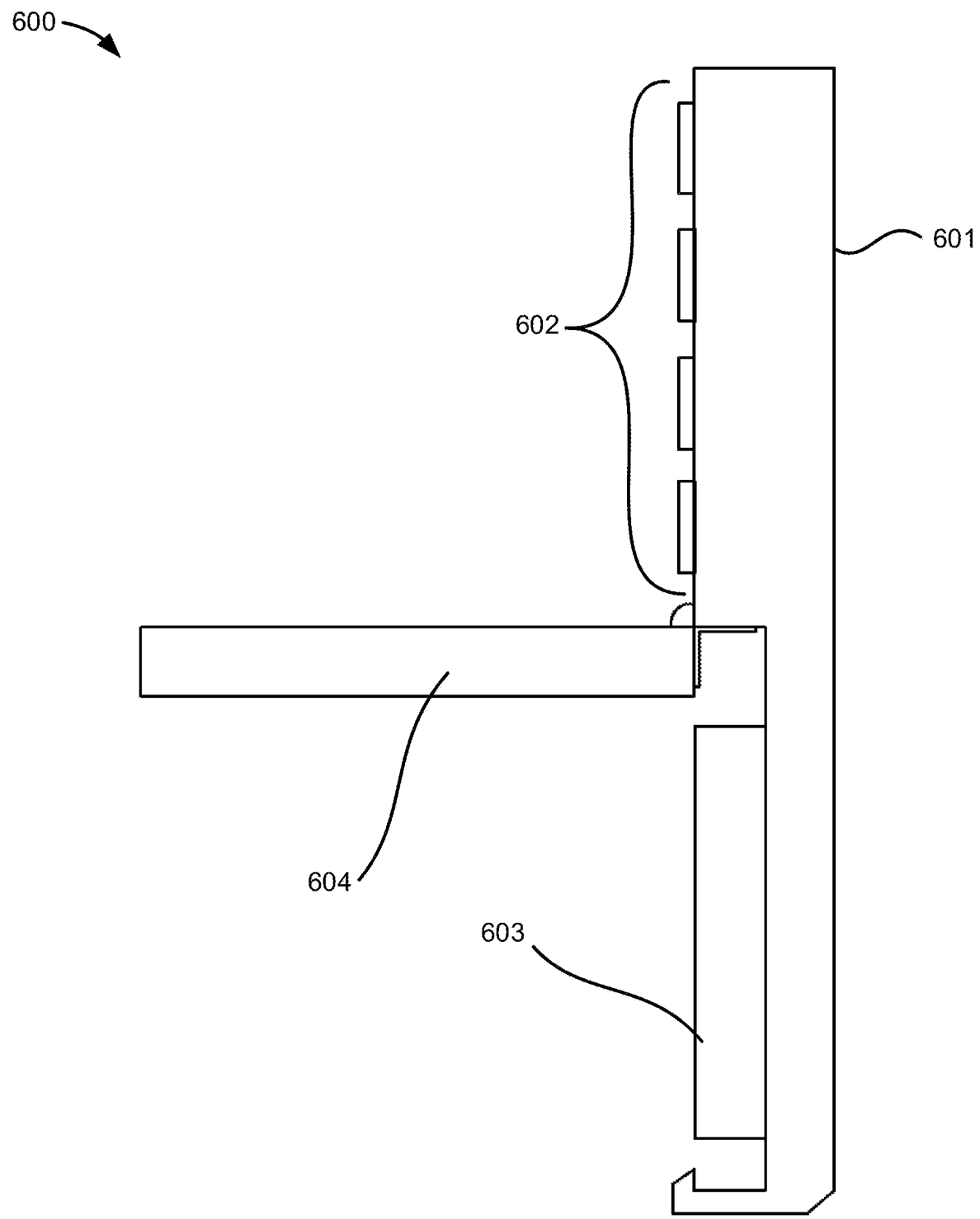

FIGS. 6A-C depict various views of a remote input receptor incorporating a voice input processor. The remote input receptor 600 includes a user interface 601 for receiving one or more user inputs from a user. The user interface includes a PIN pad 602 and a voice input processor 603. The remote input receptor 600 includes a hinged lid 604 that opens to allow placement and removal of the voice input processor 603. The voice input processor includes a microphone 605 and a speaker 606. User inputs for interfacing with the remote input receptor 600 may include presses of keys on the PIN pad 602 and/or vocalizations received by the microphone 605 of the voice input processor 603. Vocalizations may include one or more syllables uttered by the user, and are described in more detail below regarding subsequent FIGs. The voice input processor may be multi-lingual.

The voice input processor 603 may include any of a variety of artificial intelligence processors and digital assistants, such as Siri, Cortana, Google Assistant, Google Voice, Alexa, Amazon Echo, Amazon Echo Dot, and/or other equivalents. The hinged lid 604 may allow for interchangeability of the voice input processor 603.

A cloud-based network, such as is described above regarding FIGS. 1, 2, 4A-B and 5, may store one or more acceptable inputs, and may include a network device (again as described above regarding FIGS. 1, 2, 4A-B and 5) for obtaining said user inputs from the remote input receptor 600. The network device may obtain said user inputs from the remote input receptor 600 while the user is using the user interface 601, and the cloud-based network may compare the user inputs to the acceptable inputs. For example, the remote input receptor may concurrently transmit the user's vocalizations as the user utters the vocalizations. The cloud-based network may begin comparing the user input to acceptable inputs as the user is completing the user input. Such may reduce the latency between the user providing input and the user, for example, being granted access to an enclosure.

The acceptable inputs may correspond to one or more voice profiles and/or sets of syllables that, when uttered by a user, may cause actuation of a device, such as an access control mechanism securing access to an enclosure (such as shown in and described regarding FIG. 5). Such voice profiles are described below in more detail.

Figure 7:
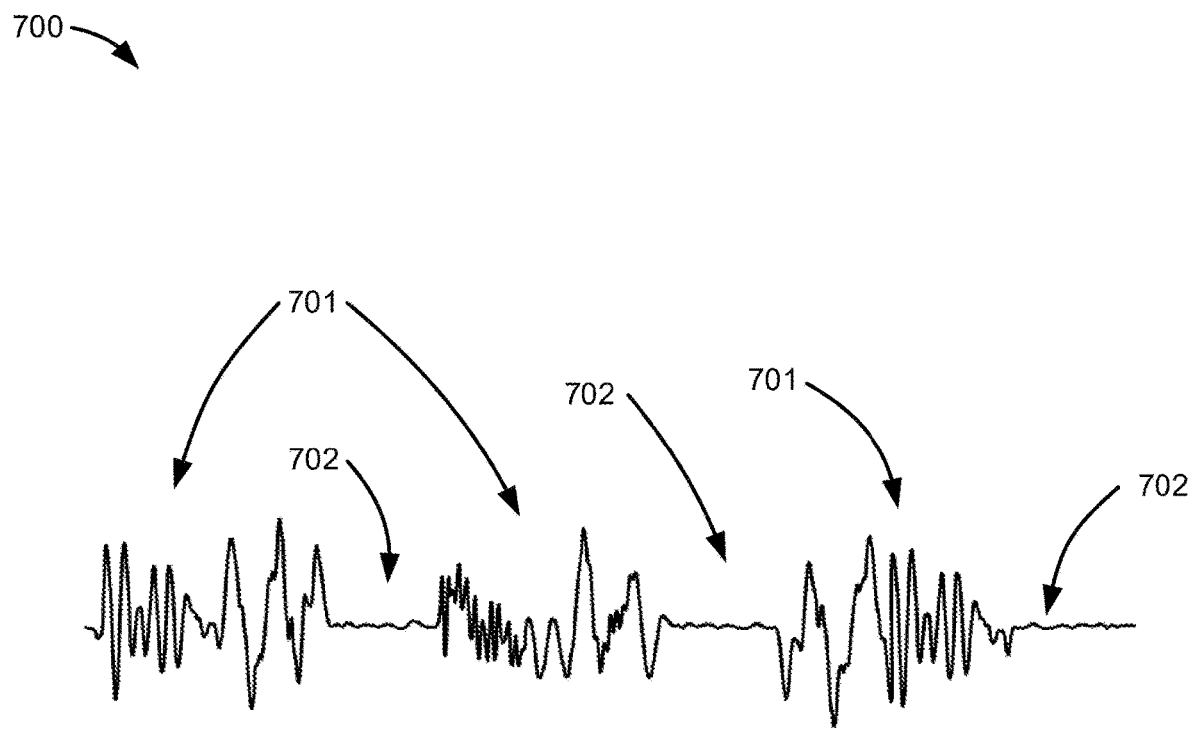
FIG. 7 depicts a sample of an acceptable input for the voice input processor.

FIG. 7 depicts a sample of an acceptable input for the voice input processor. The acceptable input 700, as shown, is a voice profile. The acceptable input may correspond to a voice input processor that performs discreet speech recognition to create a user's voice profile that the cloud-based network compares to the acceptable input 700 voice profile. The acceptable input 700 may be one of several or many acceptable inputs stored by the cloud-based network. As depicted, the acceptable input 700 includes word utterances 701 (i.e. vocalizations) separated by pauses 702. The pauses are greater than a minimum pause required. The minimum pause required may range from 0.25 s to 1.5 s. Such may be required based on the computational limitations of the voice input processor. While less robust than, for example, continuous speech or natural language recognition, such a voice input processor may be less expensive than voice input processors incorporating more robust recognition. In cases where the user input does not have the required pauses, the remote input receptor may provide a failure indication to the user, such as by a sound emitted by the speaker or illumination of a light.

As shown and described regarding subsequent FIGs., the voice input processor may perform continuous speech recognition to create a voice profile that the cloud-based network compares to the acceptable input 700. In such embodiments, pauses of too great a duration between word utterances may cause failure of the recognition. For example, failure may occur as the pauses are greater than a maximum allowable pause ranging from 0.1 s to 1.0 s. The remote input receptor may accordingly provide a failure indication, as described above.

Figure 8A:
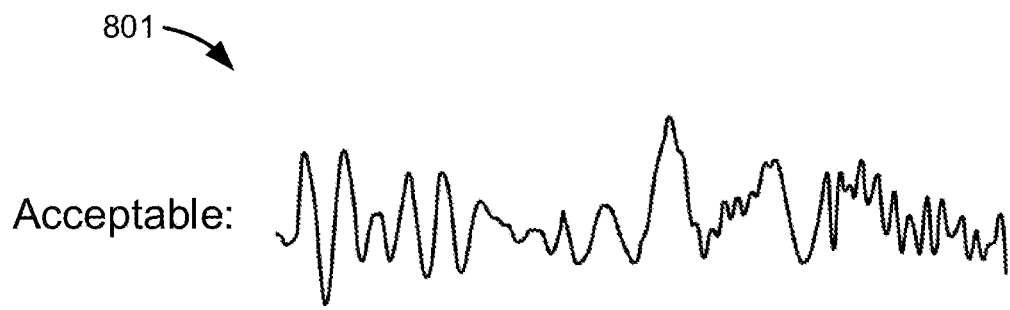
FIGS. 8A-C depict a comparison of an acceptable input to two user inputs.
Figure 8B:
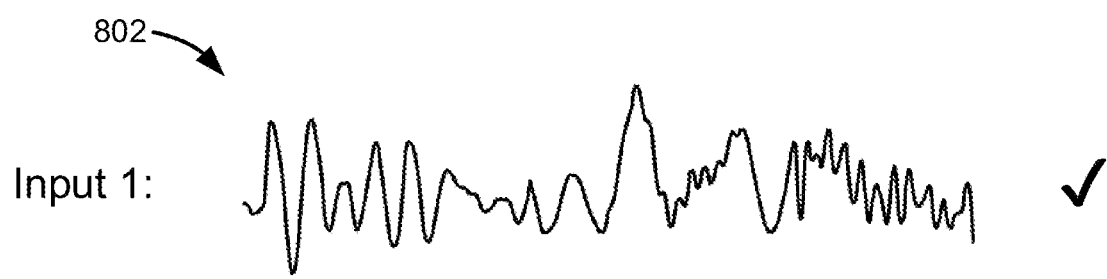
Figure 8C:
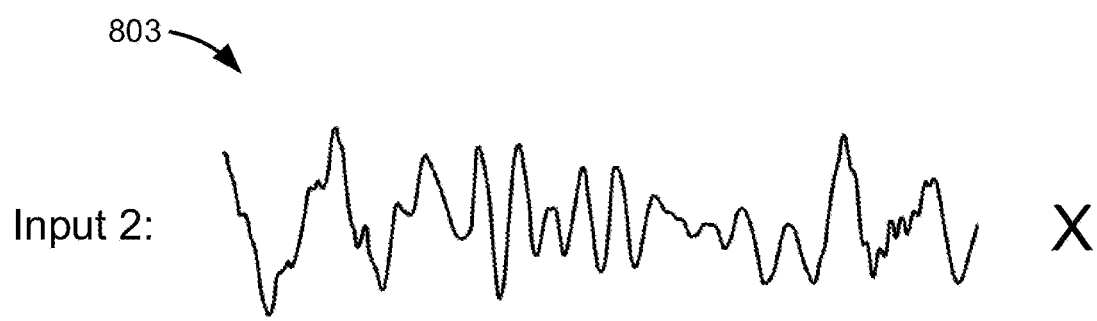

FIGS. 8A-C depict a comparison of an acceptable input to two user inputs. The acceptable input 801 corresponds to a voice profile stored on the cloud-based network and previously authorized as acceptable. The first input 802 matches the voice profile, and would lead to authorization of the desired function at the remote input receptor. The second input 803 does not match, and would not lead to the desired function being performed. Such functions, or commands, may include updating a voice profile stored on the cloud-based network, adding new acceptable inputs to the cloud-based network, removing one or more of the one or more acceptable inputs from the cloud-based network, changing permissions associated with one or more of the one or more acceptable inputs, changing settings of the remote input receptor, or combinations thereof.

Figure 9A:
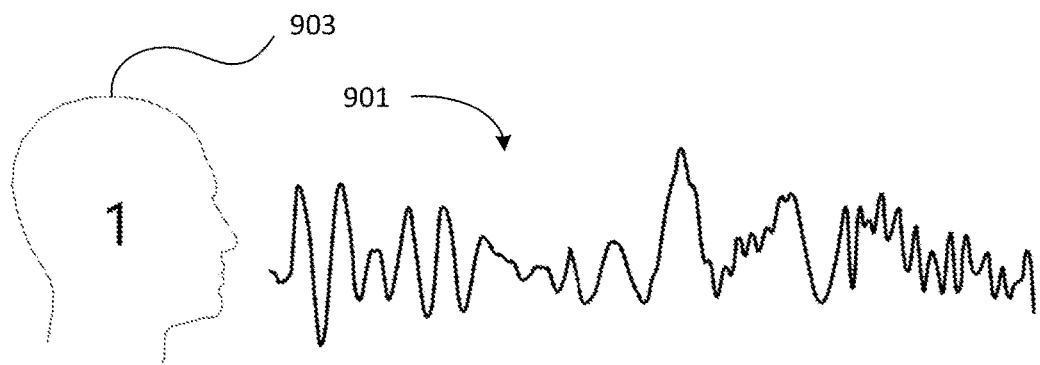
FIGS. 9A-C depict another comparison of an acceptable input with two user inputs.
Figure 9B:
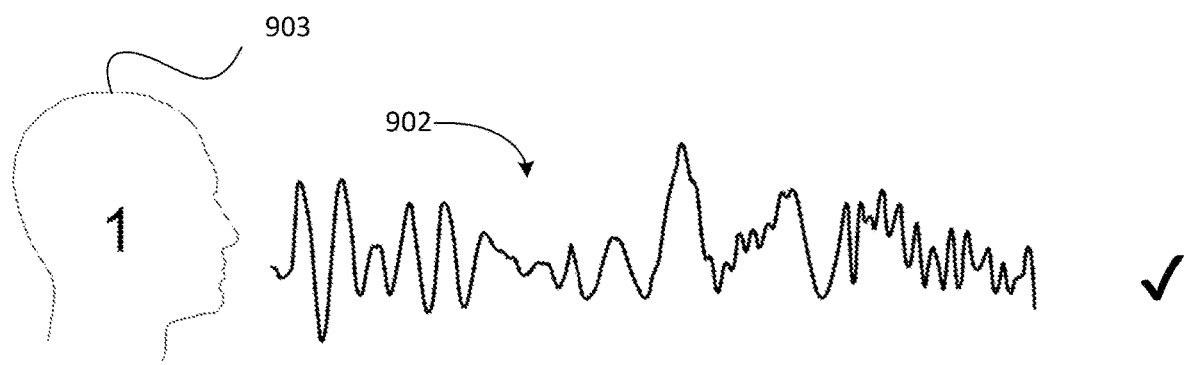
Figure 9C:
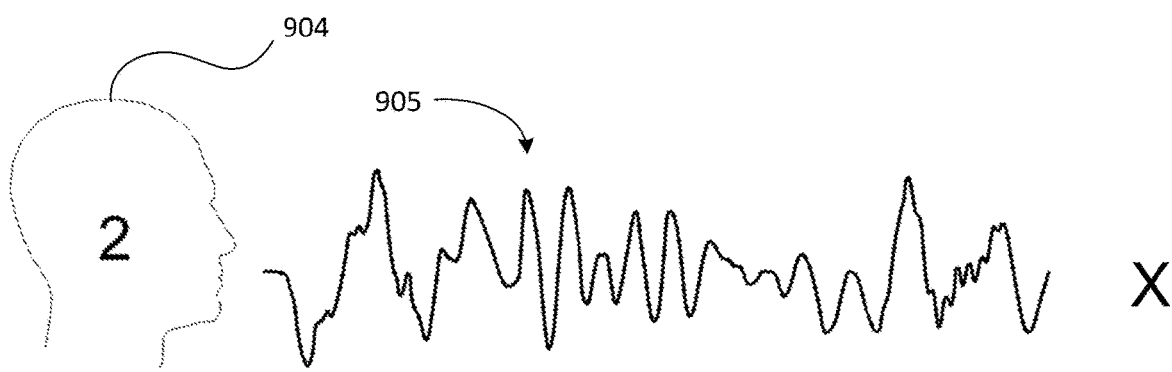

FIGS. 9A-C depict another comparison of an acceptable input with two user inputs. The acceptable input 901 is user-dependent, such that the voice profile of the acceptable input 901 is based on a vocal register 902 unique to an authorized user 903. Thus, the remote input receptor will respond to commands provided by the authorized user 903, but not to an unauthorized user 904 with a different vocal register 905 than the authorized user 903.

Figure 10A:
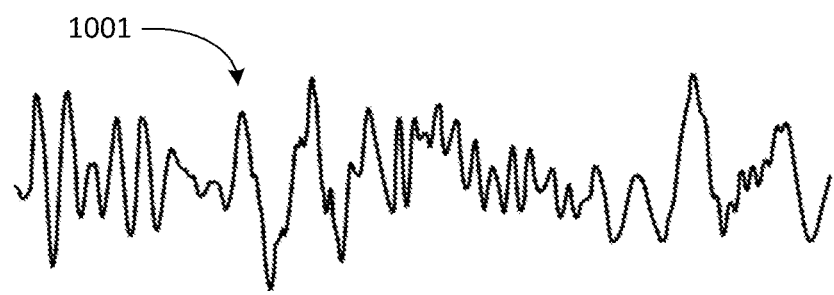
FIGS. 10A-B depict a comparison of a user-independent acceptable input compared to various user inputs.
Figure 10B:
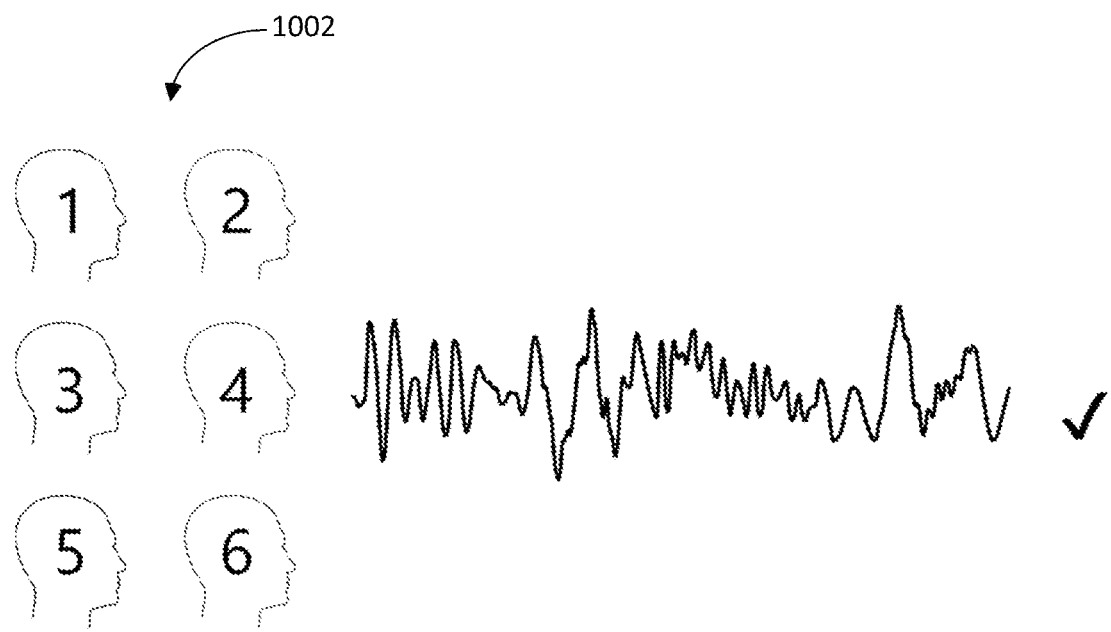

FIGS. 10A-B depict a comparison of a user-independent acceptable input compared to various user inputs. The acceptable input 1001 comprises an abstraction of a myriad of different voices. The acceptable input 1001 may be independent of actual pitch, timbre and vocal breaks, and may instead depend on relative differences. Thus, a person stating the word "Access," while having a unique vocal register, will have a similar pattern to the abstracted acceptable input 1001. Thus, many users 1002 may be authorized by simply knowing, for example, the correct order of syllables, such as stating "May I please enter."

Figure 11A:
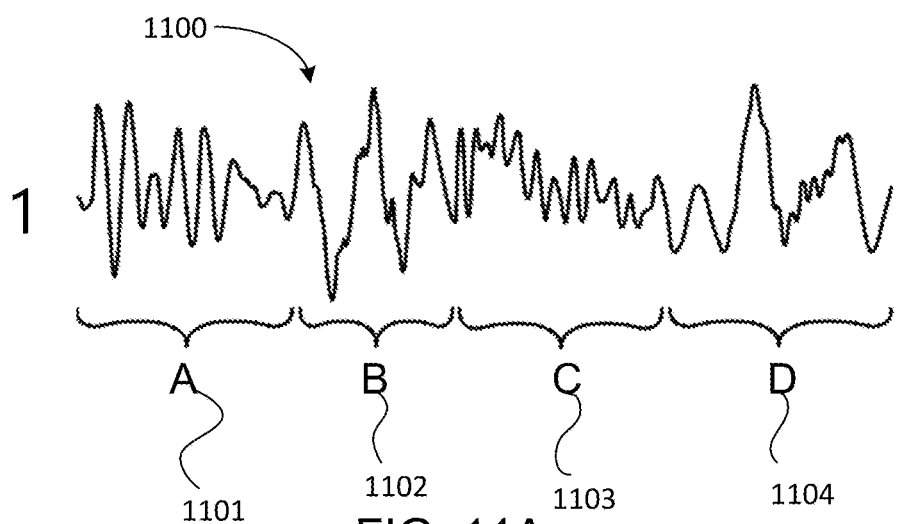
FIGS. 11A-C depict a voice profile comparison in an order-dependent system.
Figure 11B:
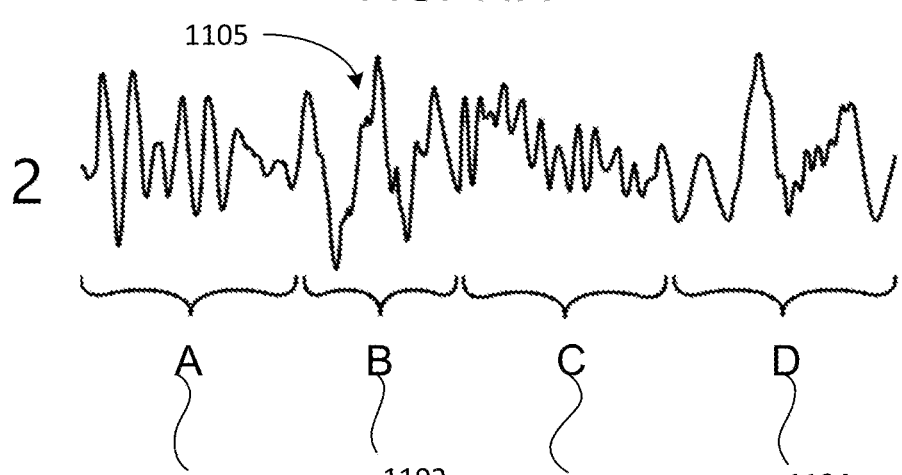
Figure 11C:
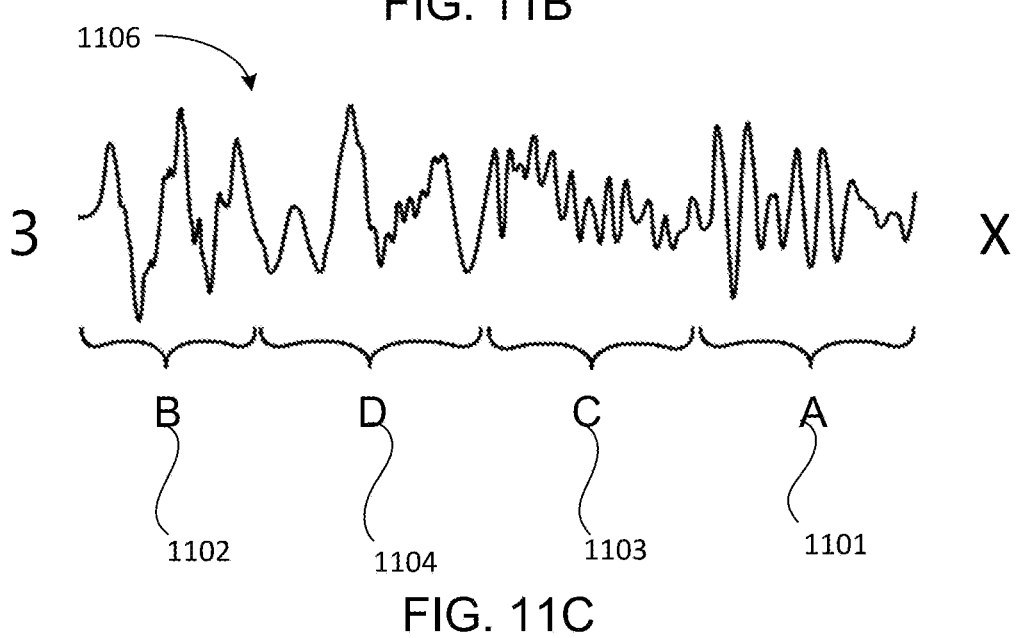

FIGS. 11A-C depict a voice profile comparison in an order-dependent system. The acceptable input 1100 represents a voice profile based on four syllables 1101, 1102, 1103 and 1104 (though any set of two or more syllables may be sufficient). The first user input 1105 represents the same syllables vocalized in the same order. Thus, in the present ordered system, the first user input 1105 would result in authorization. The second user input 1106 represents the same syllables in a different order: 1102, 1104, 1103 and 1101. Such vocalization would not result in authorization.

Figure 12A:
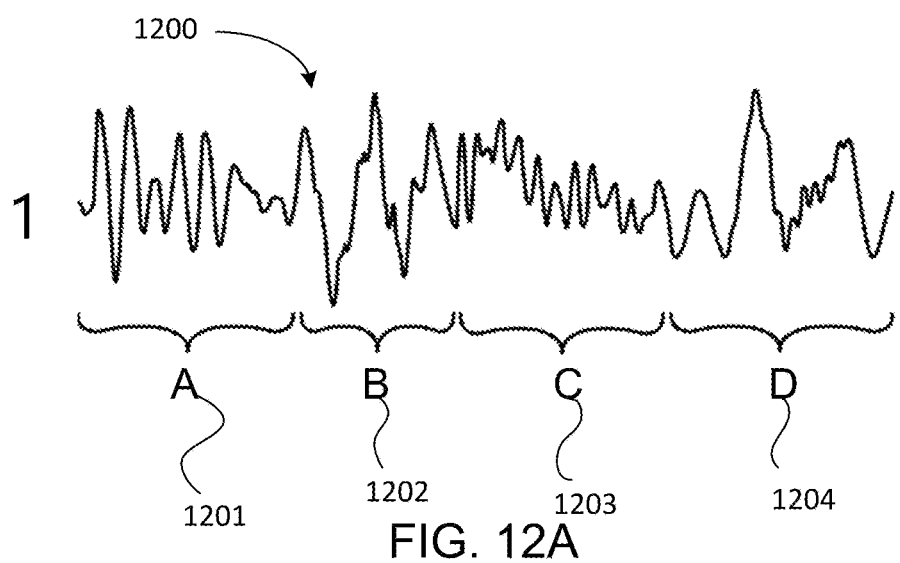
FIGS. 12A-C depict a voice profile comparison in an order-independent system.
Figure 12B:
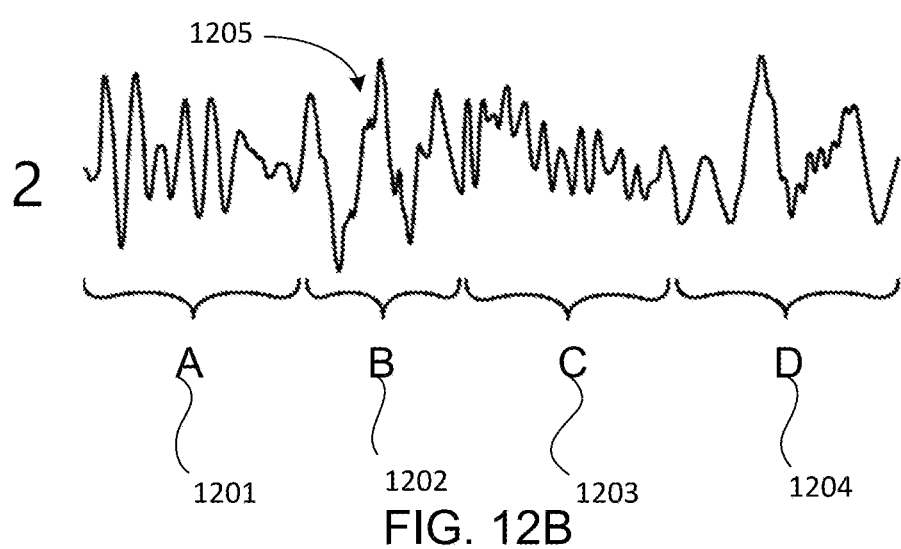
Figure 12C:
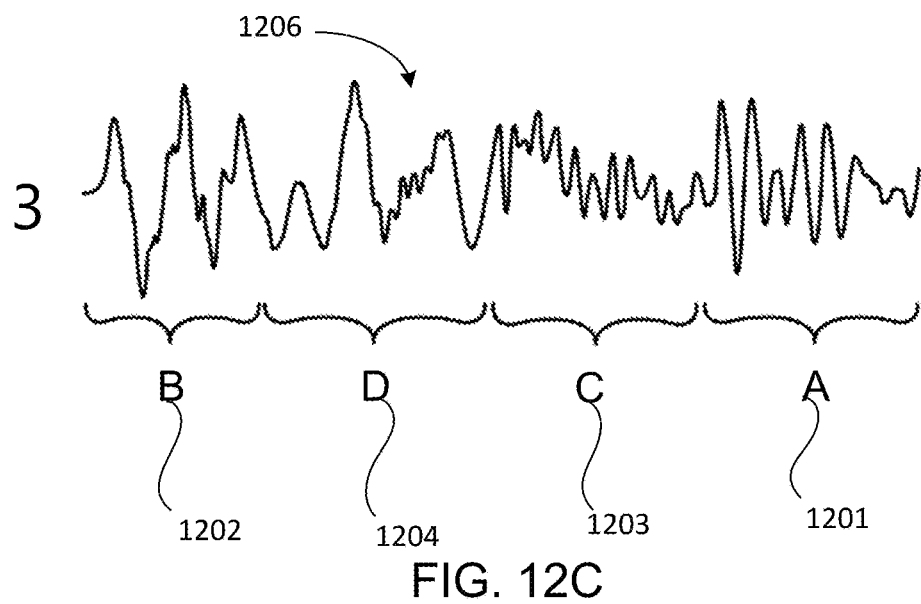

FIGS. 12A-C depict a voice profile comparison in an order-independent system. The acceptable input 1200 represents a voice profile based on four syllables 1201, 1202, 1203 and 1204 (though any set of two or more syllables may be sufficient). The first user input 1205 represents the same syllables vocalized in the same order, which would result in authorization. The second user input 1206 represents the same syllables in a different order: 1202, 1204, 1203 and 1201. Such vocalization would also result in authorization.

A natural language system is one example of an order-independent system, with added intelligence to understand context regarding the order of the syllables. The voice input processor may perform natural language recognition to process commands provided to the remote input receptor by the user. Such may occur because the voice input processor recognizes all possible syllables that a user may vocalize. Natural language processing may be performed at the voice input processor, and may be processed to understand a particular command expressed by the user and the user's vocal register. The vocal register may correspond to the acceptable input. The voice input processor may reduce the natural language command to a command stored on the cloud-based network. Once the cloud-based network recognizes the user's vocal register and the command, the desired operation may be performed.

Whereas the present invention has been described in particular relation to the drawings attached hereto, it should be understood that other and further modifications apart from those shown or suggested herein, may be made within the scope and spirit of the present invention.

We claim:

1. A secure remote actuation system, comprising:
  a network, wherein the network is a cloud-based network that includes a plurality of computer systems interconnected by telecommunications equipment;

a remote device communicatively coupled to the network via a wireless connection, the remote device comprising a user interface for receiving a vocalization from a user, the user interface comprising a voice input processor, wherein the remote device sends a signal based on the vocalization via the network while the user is using the user interface;

an access barrier comprising an access control device, wherein the access control device is communicatively coupled to the network; and a network device communicatively coupled to the network, wherein the network device is one of the plurality computer systems in the cloud-based network, the network device storing one or more acceptable inputs and one or more input parameters, wherein the network device receives the signal from the remote device via the network, compares the received signal with the one or more acceptable inputs and the one or more input parameters, wherein the one or more acceptable inputs comprises a voice profile, and sends a command to the access control device via the network when the received signal conforms with at least one of the one or more acceptable inputs and conforms with each of the one or more input parameters, and wherein the one or more input parameters comprises a limitation on a number of times the at least one of the one or more acceptable inputs is used.

2. The secure remote actuation system of claim 1, wherein the voice input processor comprises a microphone.

3. The secure remote actuation system of claim 2, wherein the voice input processor comprises a speaker.

4. The secure remote actuation system of claim 1, wherein the voice profile is user-dependent.

5. The secure remote actuation system of claim 4, wherein the voice profile is based on a vocal register unique to the user.

6. The secure remote actuation system of claim 4, wherein the voice profile is based on two or more syllables.

7. The secure remote actuation system of claim 6, wherein the one or more acceptable inputs comprises an ordered set of the syllables.

8. The secure remote actuation system of claim 6, wherein the one or more acceptable inputs comprises a set of the syllables that is order-independent.

9. The secure remote actuation system of claim 1, wherein the voice profile is user-independent.

10. The secure remote actuation system of claim 9, wherein the voice profile is based on two or more syllables.

11. The secure remote actuation system of claim 9, wherein the one or more acceptable inputs comprises an ordered set of the syllables.

12. The secure remote actuation system of claim 9, wherein the one or more acceptable inputs comprises a set of the syllables that is order-independent.

13. The secure remote actuation system of claim 1, wherein the voice input processor performs discrete speech recognition to create a voice profile that the network device compares to the one or more acceptable inputs.

14. The secure remote actuation system of claim 13, wherein the remote device provides a failure indication to the user as a pause between vocalizations by the user is less than a minimum required pause ranging from 0.25 s to 1.5 s.

15. The secure remote actuation system of claim 1, wherein the voice input processor performs continuous speech recognition to create a voice profile that the network device compares to the one or more acceptable inputs.

16. The secure remote actuation system of claim 15, wherein the remote input receptor provides a failure indication to the user as a pause between vocalizations by the user is greater than a maximum allowable pause ranging from 0.1 s to 1.0 s.

17. The secure remote actuation system of claim 1, wherein the voice input processor performs natural language recognition to process commands provided to the remote device by the user.

18. The secure remote actuation system of claim 1, wherein the commands comprise updating a voice profile stored on the network device, adding new acceptable inputs to the network device, removing one or more of the one or more acceptable inputs from the network device, changing permissions associated with one or more of the one or more acceptable inputs, changing settings of the remote device, or combinations thereof.

19. The secure remote actuation of claim 1, wherein the voice input processor is multi-lingual.

* * * * *